United States Patent
Hsiao et al.

(10) Patent No.: US 8,589,115 B2
(45) Date of Patent: Nov. 19, 2013

(54) SYSTEM AND METHOD FOR ESTIMATING TORQUE AND ROTATIONAL SPEED OF MOTOR

(75) Inventors: Fei-Bin Hsiao, Tainan (TW);
Chung-Neng Huang, Tainan (TW)

(73) Assignee: National Cheng Kung University, Tainan (TW)

( * ) Notice: Subject to any disclaimer, the term of this patent is extended or adjusted under 35 U.S.C. 154(b) by 406 days.

(21) Appl. No.: 13/043,487

(22) Filed: Mar. 9, 2011

(65) Prior Publication Data
US 2011/0231146 A1    Sep. 22, 2011

(30) Foreign Application Priority Data

Mar. 16, 2010  (TW) ................ 99107661 A

(51) Int. Cl.
*G01P 3/02*    (2006.01)
*G01P 3/04*    (2006.01)
*G01C 21/10*    (2006.01)
*G06F 3/00*    (2006.01)

(52) U.S. Cl.
USPC ............ 702/147; 702/149; 702/150; 702/182

(58) Field of Classification Search
USPC ............ 702/41, 46, 147, 149, 150, 173, 182, 702/185; 73/659; 318/565; 700/29; 704/270; 706/14
See application file for complete search history.

(56) References Cited

U.S. PATENT DOCUMENTS

| | | | |
|---|---|---|---|
| 5,419,197 A * | 5/1995 | Ogi et al. .................. | 73/659 |
| 5,761,383 A * | 6/1998 | Engel et al. ................ | 706/14 |
| 6,262,550 B1 * | 7/2001 | Kliman et al. ............. | 318/565 |
| 7,024,335 B1 * | 4/2006 | Parlos .......................... | 702/182 |
| 7,035,188 B2 | 4/2006 | Shen | |
| 7,437,201 B2 * | 10/2008 | Cullen ........................ | 700/29 |
| 8,145,492 B2 * | 3/2012 | Fujita .......................... | 704/270 |

FOREIGN PATENT DOCUMENTS

| | | |
|---|---|---|
| CN | 1109972 A | 10/1995 |
| CN | 101166232 A | 4/2008 |
| CN | 101206159 A | 6/2008 |
| CN | 101938246 A | 1/2011 |
| JP | 0349845 A | 3/1991 |
| KR | 1998-030475 A | 7/1998 |
| TW | 200736645 | 10/2007 |
| TW | 200816603 | 4/2008 |
| TW | I323547 B | 4/2010 |

* cited by examiner

*Primary Examiner* — Marc Armand
*Assistant Examiner* — Felix Suarez
(74) *Attorney, Agent, or Firm* — CKC & Partners Co., Ltd.

(57) ABSTRACT

A system and a method for estimating a torque and a rotational speed of a motor are disclosed. The system includes a sound receiving device, a feature extraction device, and an artificial neural network module. In the method, at first, a plurality of training data are provided, wherein the training data includes a plurality of history sound feature values of the motor and history torque values or history rotation values corresponding thereto. Thereafter, an artificial neural network stored in the artificial neural network module is trained by the history data to obtain a motor model of the motor. Then, a motor sound signal made by the motor in a working state is received. Thereafter, sound feature values of the motor sound signal are extracted. Thereafter, the rotational speed value and the torque value are computed by the motor model in accordance with the at least one sound feature value.

14 Claims, 5 Drawing Sheets

SYSTEM AND METHOD FOR ESTIMATING TORQUE AND ROTATIONAL SPEED OF MOTOR

RELATED APPLICATIONS

This application claims priority to Taiwan Application Serial Number 99107661, filed Mar. 16, 2010, which is herein incorporated by reference.

BACKGROUND

1. Field of Invention

The present invention relates to a system and a method for estimating a torque and a rotational speed of a motor.

2. Description of Related Art

Currently, when using motors to perform variable speed driving, various mechanical products in the market mostly need to use a speed sensor for detecting the position of a motor rotor as a base for speed feedback. However, either an electromagnetic or optical sensor used for speed feedback on the motor operation will result in great limitations and cost burden, not to mention the mechanical maintenance problems of the sensor. Therefore, a sensorless driving technology is developed.

Although the sensorless driving technology may resolve most of the problems caused by the sensor, yet most of the sensorless driving methods require a high-speed digital signal processor (DSP) to complete a multitude of mathematic operations with a complicated process, and nowadays, the high-speed DPS is quite expensive.

Hence, there is a need to develop a system and a method for precisely estimating a torque and a rotational speed of a motor without needing to use a conventional electromagnetic or optical sensor for speed feedback and a high-speed DSP for mathematic operations,

SUMMARY

An aspect of the present invention is to provide a system for estimating a torque and a rotational speed of a motor without needing to use a high-speed DSP.

Another aspect of the present invention is to provide a method for estimating a torque and a rotational speed of a motor without needing to use a high-speed DSP.

According to an embodiment, the aforementioned system for estimating a torque value or a rotational speed value of a motor includes a sound receiving device, a feature extraction device, and an artificial neural network module. The sound receiving device is used for receiving a sound signal of the motor when the motor is in operation. The feature extraction device is used to extract at least one sound feature value of the sound signal. The artificial neural network module is used to receive a plurality sets of training data to build a motor model for the motor, and to input the at least one sound feature value of the sound signal into the motor model to compute the torque value or the rotational speed value of the motor, wherein the sets of training data include a plurality of historical sound feature values of the motor and a plurality of historical torque values or historical rotational speed values of the motor corresponding to the historical sound feature values respectively.

According to another embodiment, the aforementioned system for estimating rotational speed of a motor includes a sound receiving device, a feature extraction device, and an artificial neural network module. The sound receiving device is used for receiving a sound signal of the motor when the motor is in operation. The feature extraction device is used to extract at least one sound feature value of the sound signal. The artificial neural network module is used for receiving a plurality of sets of training data to build a motor model for the motor, and inputting the at least one sound feature value of the sound signal to the motor model to compute the rotational value of the motor, to wherein the sets of training data include a plurality of historical sound feature values of the motor and a plurality of historical rotational values of the motor corresponding to the historical sound feature values respectively.

According to further another embodiment, the aforementioned method for estimating a rotational speed value of a motor includes a model creation phase and an estimating phase. In the model creation phase, a plurality of sets of training data are provided. The training data include a plurality of historical sound feature values of a plurality of historical sound signals of the motor and a plurality of historical rotational speed values of the motor corresponding to the historical sound feature values. Then, the training data are used to train an artificial neural network to building a motor model for the motor. In the estimating phase, a sound signal of the motor is received, when, the motor is in operation. Then, at least one sound feature value of the sound signal is extracted. Thereafter, the motor model is used to compute the rotational speed value of the motor by inputting the at least one sound feature value into the motor model.

The embodiments of the present invention provide systems and methods for estimating rotational speed and torque of a motor in which a model built by an artificial neural network and feature analysis on sound signals are used. The embodiments of the present invention are not involved in complex and great mathematic operation, so the embodiments of the present invention do not need high speed DSP, and the application and estimating accuracy thereof are not limited or affected by the environment of the motor.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
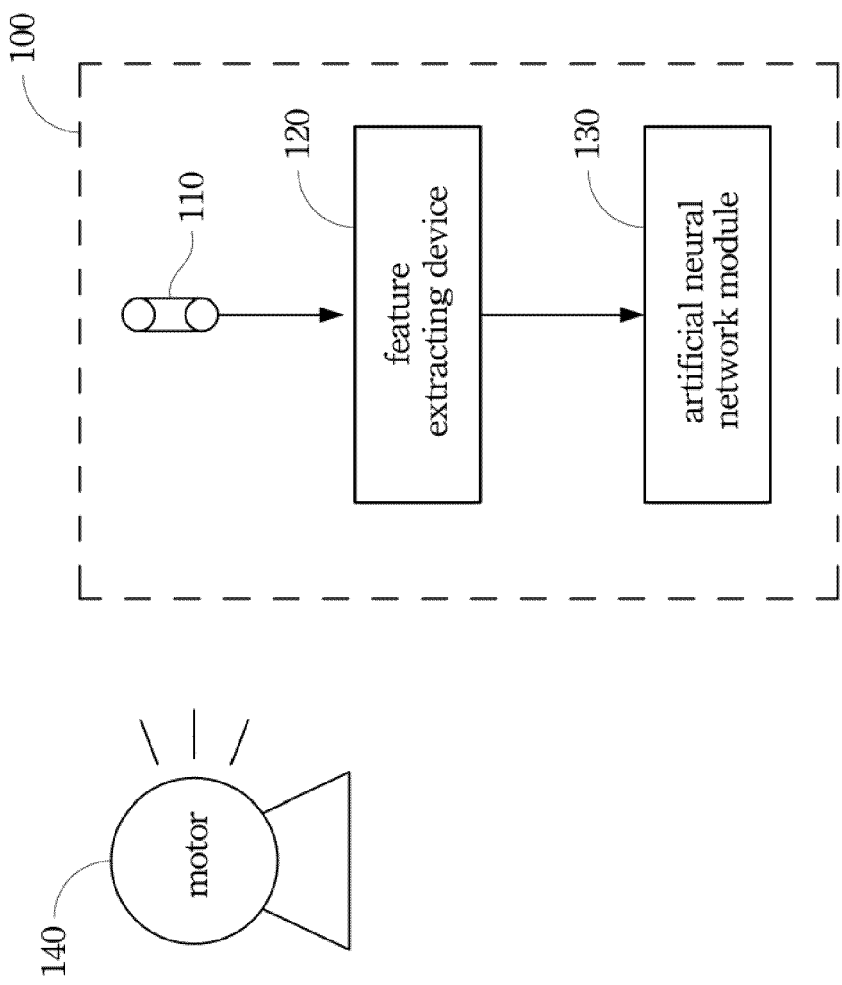
FIG. 1 is a functional block diagram showing a system for estimating a torque value and a rotational speed value of a motor according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a functional block diagram showing a system 100 for estimating a torque value and a rotational speed value of a motor. The system 100 includes a sound receiving device 110, a feature extraction device 120, and an artificial neural network module 130. In this embodiment, the sound receiving device 110 is a microphone, and the feature extraction device 120 is a fast fourier transform module, and the artificial neural network module 130 is a 8051 single chip or a field programmable gate array (FPGA) implementing an artificial neural network. The functions of these devices will be explained in the description as bellow.

Figure 2:
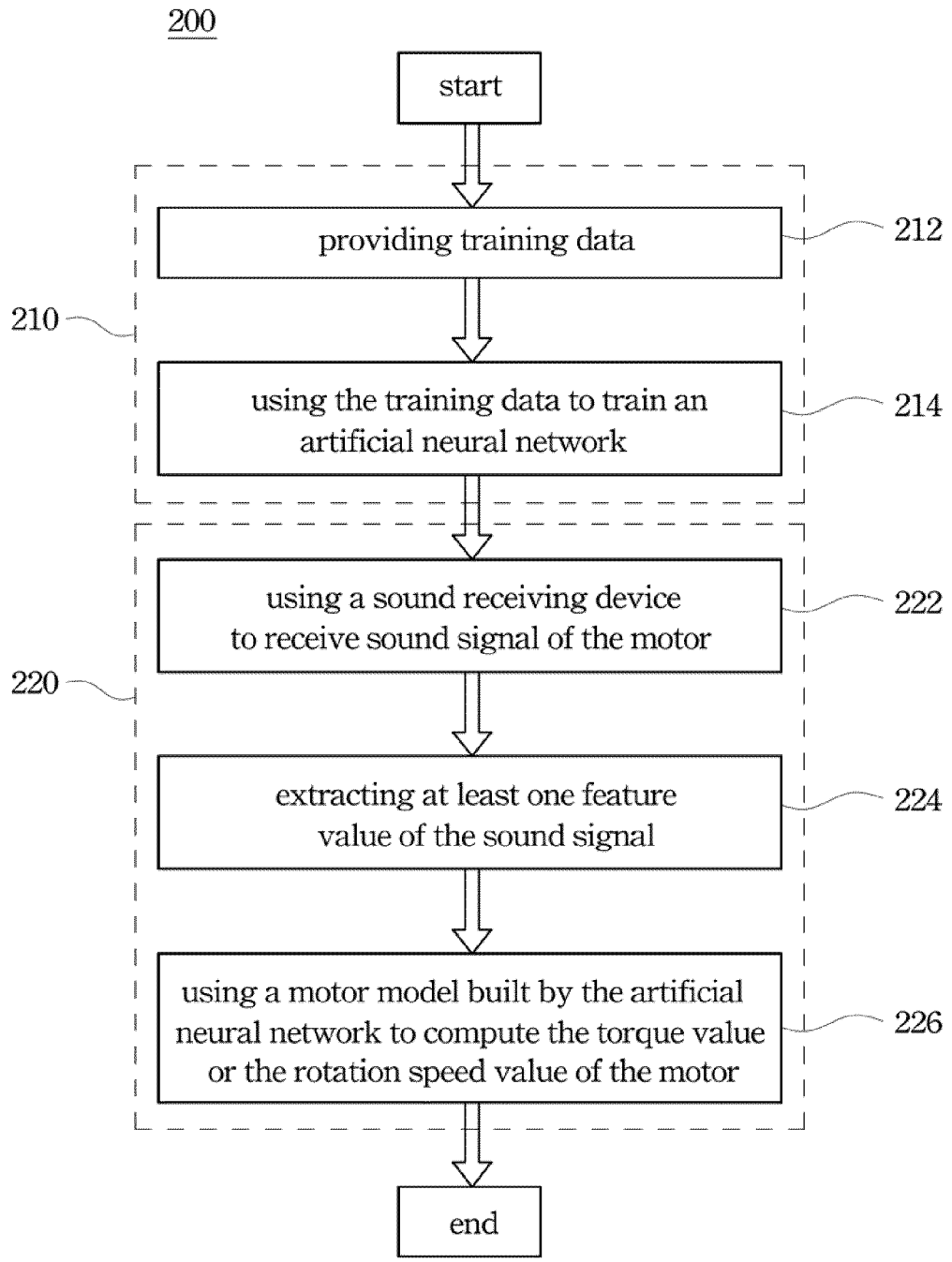
FIG. 2 is a flow chart showing a method for estimating a torque value and a rotational speed value of the motor according to an embodiment of the present invention.

Referring to FIG. 2, FIG. 2 is a flow chart showing a method 200 for estimating a torque value and a rotational speed value of the motor 140 (shown in FIG. 1). In this embodiment, the method 200 includes a model creation phase 210 and an estimating phase 220. The model creation phase 210 is performed to build a motor model which can be used to estimate the torque value and the rotational speed value of the motor 140 and the estimating phase 220 is performed to estimate the torque value and the rotational speed value of the motor 140 by using the motor model.

In the model creation phase 210, at first, a data providing step 212 is performed to provide a plurality of sets of training data. These training data include a plurality of historical sound feature values of historical sound signals of the motor 140 (for example, a frequency value) and a plurality historical motor torque value and rotational speed value corresponding thereto. In this embodiment, the training data is obtained through the sound receiving device 110 and the feature extraction device 120 during a data collection stage. In the data collection stage, the sound receiving device 110, and the feature extraction device 120 are used to receive the sound signals of the motor 140 and extract the sound feature values of the sound signals respectively, and thus a great number of the historical sound feature values are obtained and used as the training data. The historical sound feature value may correspond to the is historical torque value in a one-to-one manner or a many-to-one manner, and also correspond to the historical rotational speed value in a one-to-one manner or a many-to-one manner. Thereafter, a training step 214 is performed to use the training data to train the artificial neural network stored in the artificial neural network module 130 so as to enable the artificial neural network to build the motor mode capable of estimating the torque value and rotational speed value of the motor 140.

Figure 3:
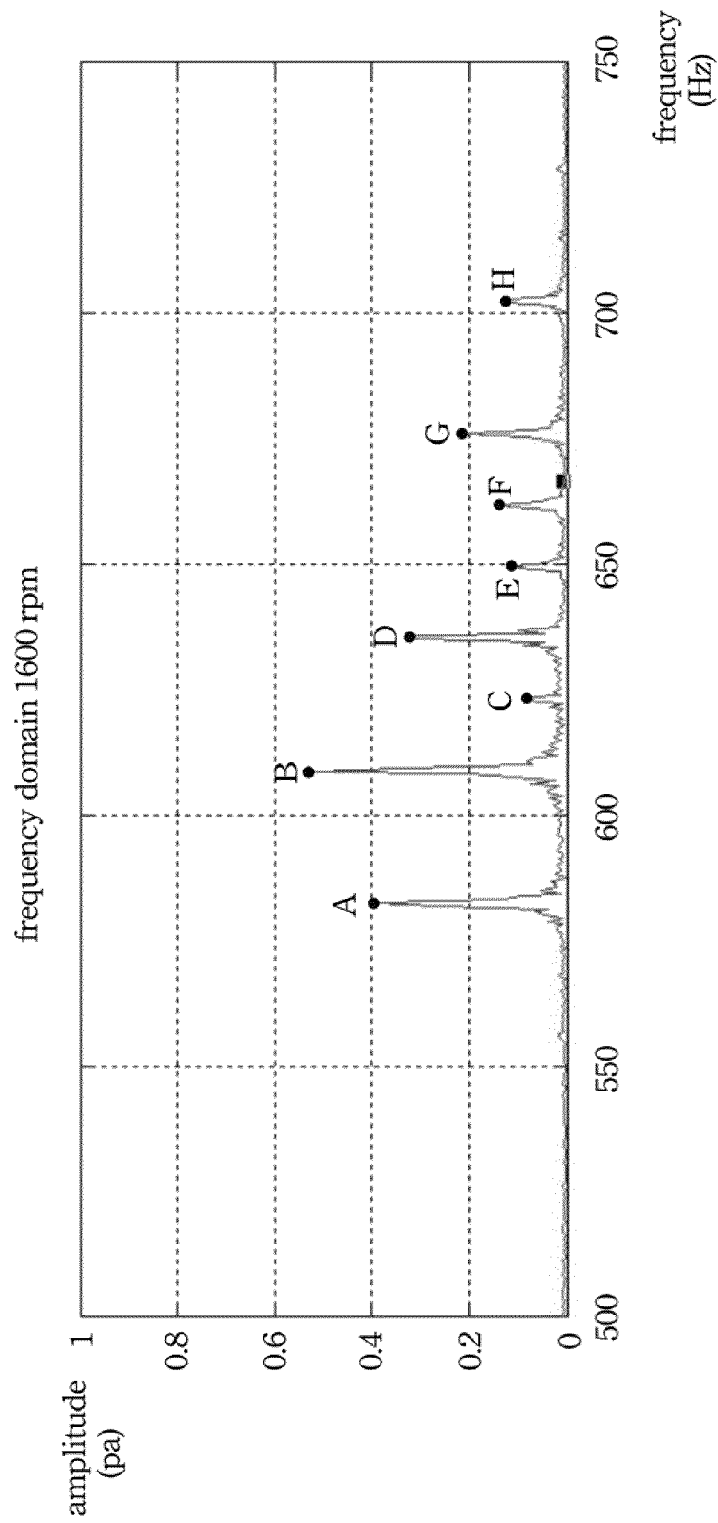
FIG. 3 is a spectrum diagram of sound signals of a motor according to an embodiment of the present invention.

In the estimating phase 220, at first, a receiving step 222 is performed to use the sound receiving device 110 to receive the sound signal of the motor 140 when the motor 140 is in operation. The sound signal may be, for example the noise made by the motor 140 when in operation. Thereafter, a feature extracting step 224 is performed to extract the sound feature value of the sound signal of the motor 140. In this embodiment, the feature extraction device 120 is used to perform a fast fourier transform on the sound signal of the motor to convert the sound signal to a frequency domain from a time domain, and then determine sound feature value in accordance with a predetermined threshold value of sound strength. Referring to FIG. 3, FIG. 3 is a spectrum diagram showing the sound signal of the motor 140. As shown in FIG. 3, it can be understood that eight feature points A, B, C, D, E, F, G, H are found when the threshold value is equal to 0.05 Pa. Each of the feature points corresponds to one frequency value, and the frequency value of the eight feature points is the sound feature value needed in this embodiment. Thereafter, a estimating step 226 is performed to use the motor model built by the artificial neural network module 130 to compute a torque value and a rotational speed value in accordance with the sound feature values extracted by the feature extraction is device 120.

For explaining the method 200 in more detail and specific, a more specific embodiment is shown as bellow.

In this embodiment, the equipments for experiment include: (1) a high sensitivity microphone with sensitivity of 34.4 mV/Pa; (2) a motor operating at a three-phase electric power of a driving voltage 220V and an operation frequency 60 Hz, and having a 4-stage breaker and a maximum rotational speed 1800 rpm; (3) a magnetic power machine capable of enabling the motor to operate with different rotational speed values and torque values; (4) an analog-to-digital converter for converting the sound signal received by the microphone from an analog type to a digital type, and thus recorded by a computer; (5) a 8051 single chip configured to provide an artificial neural network function and a fast fourier transform function; (6) a rotational speed meter, configured to measure the rotational speed value of the motor; (7) a dynamo torque meter, configured to measure the torque value of the motor.

In the experiment flow of this embodiment, at first, a power with 220V voltage and 60 Hz operating frequency is provided to the motor to start the motor. Thereafter, a manual loading function of the power machine is performed on the motor, to change the rotational speed and torque of the motor. Then, the rotational speed value and the torque value of the motor are recorded by the rotational speed meter and the dynamo torque meter, and used as target values for the training of the artificial neural network. In addition, when the rotational speed value and the torque value are recorded, the sound signal received by the high sensitivity microphone are converted to digital type by the analog-to-digital converter, and the digital sound signal is transmitted to a computer for a spectrum analysis. The spectrum analysis is performed to extract feature frequencies, and these feature frequencies corresponds to one rotational speed value and one torque value. The relationship between the feature frequencies and the rotational speed value corresponding thereto can be represented as a matrix, and the relationship between the feature frequencies and the torque value corresponding thereto can be represented as a matrix as well. The matrixes are used as inputs for the training of the artificial neural network. The data providing step 212 of the model creation phase 210 is explained as above.

As shown in the spectrum diagram obtained from the spectrum analysis, the characteristics of the rotational speed value in the frequency domain are found and it can be understood that some regularities exist among the feature frequencies at which sound features happen. Therefore, the feature frequencies at which the sound signal features of the rotational speed value happen are extracted as an input of the artificial neural network (for example a Back-propagation Neural Network). In this embodiment, the input is a 9×55 matrix, and the target of the training of the artificial neural network is a 1×55 matrix normalized from each of the rotation speed.

The matrixes mentioned above are used to train the artificial neural network after the matrixes are obtained. Because the outputs of the artificial neural network represents the rotational speed value and the torque value, the number of neurons in an output layer of the artificial neural network is set to one, and the transfer function thereof is linear. The number of neurons in a hidden layer of the artificial neural network is greater than the sum of the number of neurons of an input layer of the artificial neural network and the number of the neurons of the output layer, and smaller than twice as many as the number of the neurons of the input layer. Too many neurons would result in over-training of the artificial neural network and increase of the time required for the estimation of the torque value and the rotational speed value of the motor, so the number of neurons should be limited. For this reason, the architecture of the artificial neural network for estimating the value of the rotational speed is determined as 9-11-1, and the architecture of the artificial neural network for estimating values of torques is determined as 9-11-1. The determinations are based on a trail and error method. The training step 214 of the model creation phase 210 is explained as above.

After the training of the artificial neural network, two sets of weight values and bias values representing the models of the motor are obtained. In the following steps, the two motor models are used to estimate the rotational speed value and the torque value.

In the steps for estimating the rotational speed value and the torque value of the motor, at first, the high sensitive microphone is used to receive the sound signal of the motor. Then, the fourier transform module of the 8051 single chip is used to extract the sound feature values of the sound signal. Thereafter, the rotational speed value and torque value of the motor are computed by inputting the at least one sound feature value into the motor model. The estimating phase 220 is explained as above.

Figure 4:
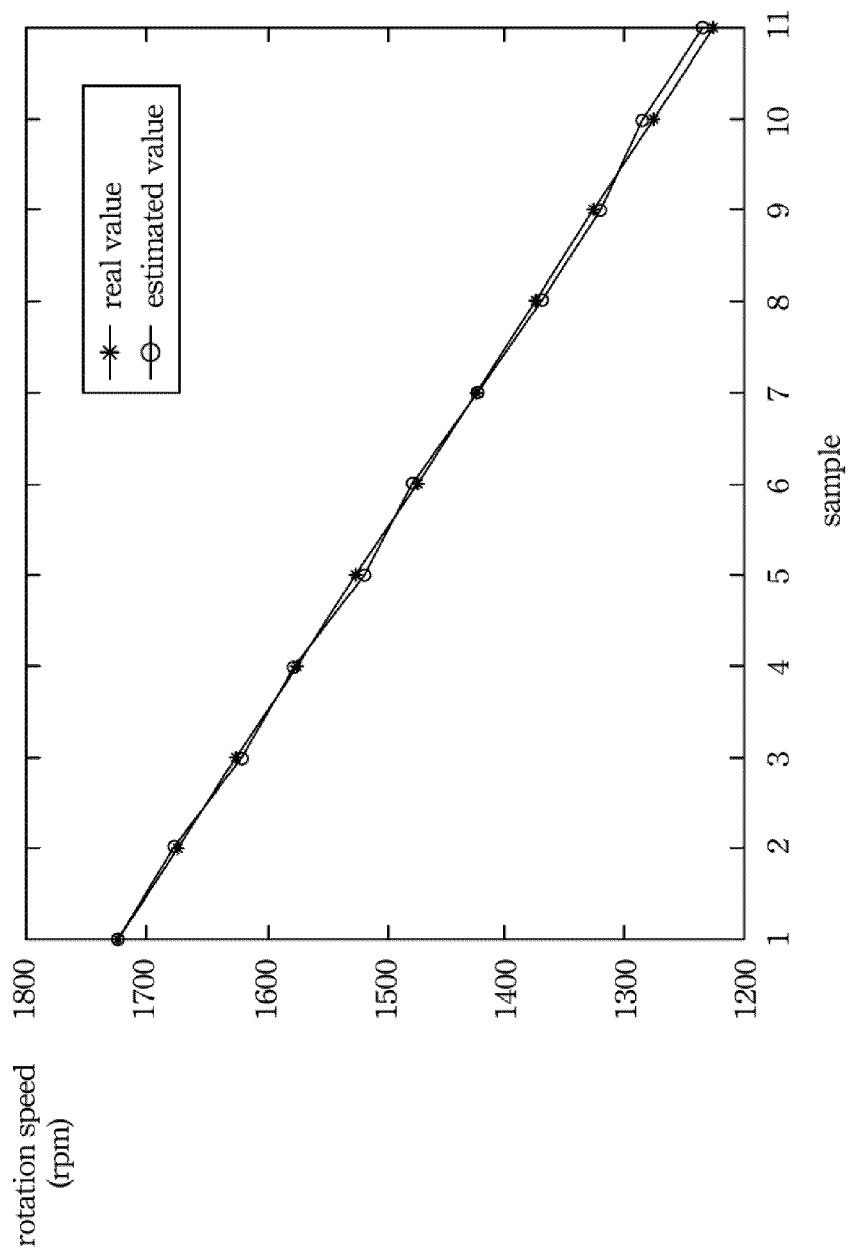
FIG. 4 is a diagram showing curves representing the relationships between actual rotational speed values and estimated rotational speed values of a motor according to an embodiment of the present invention.
Figure 5:
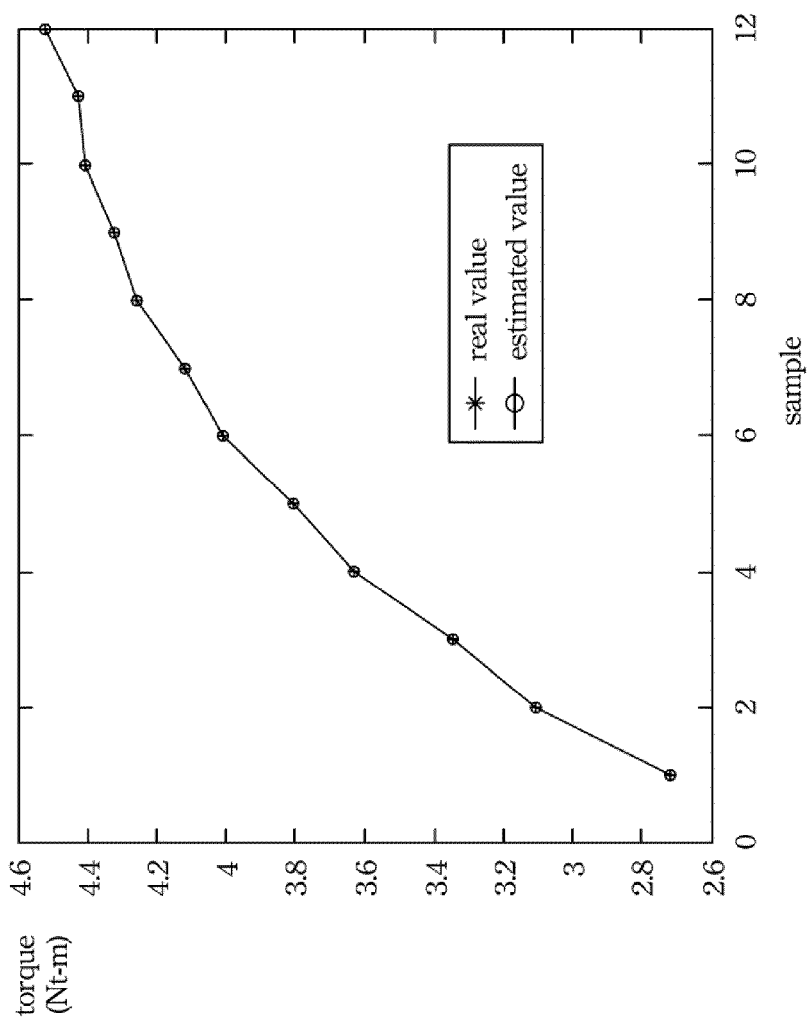
FIG. 5 is a diagram showing curves representing actual torque values and estimated torque values of a motor according to an embodiment of the present invention.

Referring to FIG. 4 and FIG. 5, FIG. 4 is a diagram showing curves representing the relationships between actual rotational speed values and estimated rotational speed values of a motor according to an embodiment of the is present invention, and FIG. 5 is a diagram showing curves representing actual torque values and estimated torque values of a motor according to an embodiment of the present invention. As shown in FIG. 4 and FIG. 5, the estimated values are very close to the actual values in this embodiment, and the error percentage reaches to 0.007%.

It is noticed that the estimations for the rotational speed value and the torque value are performed simultaneously in the above embodiments, but either the estimation for the torque value or the estimation for the rotational speed values can be performed independently in the other embodiments of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for estimating a torque value or a rotational speed value of a motor, the system comprising:
 a sound receiving device for receiving a sound signal of the motor when the motor is in operation;
 a feature extraction device for extracting at least one sound feature value of the sound signal; and
 an artificial neural network module for receiving a plurality of sets of training data to build a motor model for the motor and inputting the at least one sound feature value of the sound signal to the motor model to compute the torque value or the rotational value of the motor, wherein the sets of training data comprise a plurality of historical sound feature values of the motor and a plurality of historical torque values or historical rotational speed values of the motor corresponding to the historical sound feature values respectively, and the motor model is built in accordance with the relationship between sound feature values of the motor and rotational speed values of the motor or between sound feature values of the motor and torque values of the motor.

2. The system of claim 1, wherein the at least one sound feature value of the sound signal is at least one frequency value of the sound signal of the motor.

3. The system of claim 1, wherein the feature extraction device is a fast fourier transform (FFT) module.

4. The system of claim 1, wherein the sound receiving device is a microphone.

5. The system of claim 1, wherein the artificial neural network module is a 8051 single chip or a field programmable gate array (FPGA).

6. The system of claim 1, wherein the artificial neural network comprises an input, layer, an output layer, and a hidden layer, and the number of artificial neurons of the hidden layer is greater than one half of the sum of the number of artificial neurons of the input layer and the number of artificial neurons of the output layer, and is smaller than twice as many as the number of the artificial neurons of the input layer.

7. A method for estimating a torque value of a motor, the method comprising:
 performing a model creation phase, comprising:
  providing a plurality of sets of training data comprising a plurality of historical sound feature values of the motor and a plurality of historical torque values of the motor corresponding to the historical sound feature values respectively; and
  using the sets of training data to train an artificial neural network for building a motor model for the motor, wherein the motor model is built in accordance with the relationship between sound feature values of the motor and torque values of the motor; and
 performing an estimating phase, comprising:
  receiving, by a sound receiving device, a sound signal of the motor when the motor is in operation;
  extracting by a feature extraction device, at least one sound feature value of the sound signal; and
  computing, by the artificial neural network, the torque value of the motor by inputting the at least one sound feature value into the motor model.

8. The method of claim 7, wherein the at least one sound feature value of the sound signal is at least one frequency value of the sound signal of the motor.

9. The method of claim 7, wherein the step for extracting the at least one sound feature value of the sound signal comprises:
 converting the sound signal from a time domain to a frequency domain by using a fourier transform method; and
 extracting the at least one sound feature value of the sound signal in accordance with a predetermined sound level threshold.

10. The method of claim 7, wherein the artificial neural network comprises an input layer, an output layer, and a hidden layer, and the number of artificial neurons of the hidden layer is greater than one half of the sum of the number of artificial neurons of the input layer and the number of artificial neurons of the output layer, and is smaller than twice as many as the number of the artificial neurons of the input layer.

11. A method for estimating a rotational speed value of a motor, the method comprising:
 performing a model creation phase, comprising:
  providing a plurality of sets of training data comprising a plurality of historical sound feature values of the motor and a plurality of historical rotational speed values of the motor corresponding to the historical sound feature values respectively; and using the sets of training data to train an artificial neural network for building a motor model for the motor, wherein the motor model is built, in accordance with the relationship between sound feature values of the motor and rotational speed values of the motor; and performing an estimating phase, comprising:

receiving, by a sound receiving device, a sound signal of the motor when the motor is in operation;

extracting, by feature extraction device, at least one sound feature value of the sound signal; and computing, by the artificial neural network, the rotational speed value of the motor by inputting the at least one sound feature value into the motor model.

12. The method of claim 11, wherein the at least one feature value of the sound signal is at least one frequency value of the sound signal of the motor.

13. The method of claim 11, wherein the step for extracting the at least one sound feature value of the sound signal comprises:

converting the sound signal from a time domain to a frequency domain by using a fourier transform method; and extracting the at least one sound feature value of the sound signal in accordance with a predetermined sound level threshold.

14. The method of claim 11, wherein the artificial neural network comprises an input layer, an output layer, and a hidden layer, and the number of artificial neurons of the hidden layer is greater than one half of the sum of the number of artificial neurons of the input layer and the number of artificial neurons of the output layer, and is smaller than twice as many as the number of the artificial neurons of the input layer.

* * * * *